2,972,519
METHOD OF PREPARING DINITROGEN DIFLUORIDE

Robert D. Lipscomb, Wilmington, Del., assignor to E. I. du Pont de Nemours and Company, Wilmington, Del., a corporation of Delaware No Drawing. Filed Dec. 19, 1958, Ser. No. 781,471

2 Claims. (Cl. 23—205)

This invention relates to a new process of preparing dinitrogen difluoride.

Dinitrogen difluoride, $N_2F_2$, also called difluorodiazine, is a colorless gas stable at ordinary or moderately elevated temperatures. Dinitrogen difluoride is of great technical interest because of the recent discovery that it is a powerful initiator for the polymerization of unsaturated monomers at relatively low temperatures. Thus, for example, tetrafluoroethylene can be converted to its polymer in very good yields at temperatures of the order of 75° C. in the presence of catalytic amounts of dinitrogen difluoride. Both the cis- and the trans isomers of dinitrogen difluoride can be used for the purpose of initiating the polymerization of unsaturated monomers.

The only method heretofore known for preparing dinitrogen difluoride has been the decomposition of fluorine azide, $N_3F$, under reduced pressure at 25–100° C. This method is impractical on any but a very small scale since fluorine azide itself is prepared from hydrogen azide (hydrazoic acid) and elemental fluorine. Furthermore, it is hazardous, since fluorine azide is highly unstable and often explodes violently when it is vaporized.

It has now been found that dinitrogen difluoride can be prepared by a novel process from stable, non-hazardous, fairly readily available starting materials. The process comprises pyrolyzing a gaseous composition, in which the reactive component consists essentially of a binary nitrogen fluoride wherein the atomic ratio of fluorine to nitrogen is at least 2:1, by passing the composition through a reaction zone at a temperature of at least 1000° C. and with a contact time within the hot zone not exceeding 10 seconds, and cooling the effluent gaseous reaction product to a temperature below 100° C. within a maximum of one second.

The starting material for use in this process is a binary nitrogen fluoride in which the ratio F/N is at least 2:1. Two such nitrogen fluorides are known. One is nitrogen trifluoride, $NF_3$, a gas boiling at −129° C. which is prepared by electrolysis of molten ammonium acid fluoride with a graphite anode. The other is tetrafluorohydrazine, $F_2N$—$NF_2$, a gas boiling at −73° C. which is prepared by the thermal reaction of nitrogen trifluoride with various metals at 375° C., as recently reported by Colburn and Kennedy in J. Am. Chem. Soc. 80, 5004 (1958).

For convenience and brevity, the description which follows will make reference chiefly to nitrogen trifluoride, but it will be understood that either nitrogen trifluoride or tetrafluorohydrazine or mixtures thereof can be used for the purpose of this invention. In either case, the nitrogen fluoride used is essentially the sole reactive component present in the hot reaction zone, i.e., the pyrolysis is carried out in the substantial absence of materials reactive with the nitrogen fluoride under the operating conditions.

The mechanism of the reactions which take place during the pyrolysis is unknown. It is possible that elemental fluorine is formed, at least temporarily, but it is not found in appreciable amounts in the reaction product under the conditions used.

The thermal cleavage of nitrogen trifluoride does not proceed at a practical rate below about 1000° C. and this temperature therefore represents the minimum operating temperature. The pyrolysis temperature can be as high as can be obtained by practical means. For example, the necessary high temperatures can be obtained by means of an electric arc, whereby temperatures of the order of 2000–4000° C. or ever higher can be achieved. In fact, this temperature range is the preferred one for the pyrolysis reaction.

Apparatus of any suitable design can be used to carry out the process of this invention. For example, the reaction zone can be a tube of high softening glass, quartz or other refractory material, if desired packed with particles of an appropriate infusible, substantially inert material to improve the heat transfer, heated to at least 1000° C. in a resistance furnace or induction furnace, and provided with suitable means for very rapid quenching of the effluent gas and for collecting the reaction product.

In a variation of this method, a short, but very hot reaction zone is heated by an electric arc without, however, allowing contact between the nitrogen trifluoride and the arc flame, or plasma. This can be accomplished by means of an electrode arrangement comprising a hollow, cup-shaped anode inside which is positioned a hollow tubular cathode. The arc is struck between the tip of the cathode and the inside wall of the cup-shaped anode. It is thus confined within the cup, and further shielded from contact with the nitrogen trifluoride vapors by an inert gas, e.g., nitrogen, argon, helium, etc., introduced continuously through the hollow cathode. The gaseous nitrogen trifluoride passes through a narrow annular space formed by the outside wall of the anode and a somewhat wider concentric tube surrounding it, this space constituting the reaction zone. Pyrolysis takes place in this annular space, which is heated uniformly by the arc inside the anode to a temperature estimated to be of the order of 2000° C. or somewhat higher.

In another embodiment of the process, the nitrogen trifluoride is pyrolyzed by injecting it in the very hot gas (plasma) produced by passing an inert gas, such as nitrogen, or argon, through an electric arc. The injection point can be within the arc chamber itself but it is preferably some distance downstream from the arc, this distance however being short enough that the gas stream emerging from the arc has not cooled appreciably and in any event is still at a temperature of at least 1000° C.

In the above embodiment, wherein the $NF_3$ is pyrolyzed by injection into the very hot gas, the plasma in the post-arc region may contain vaporized carbon, when the arc electrodes are made of carbon or graphite. The vaporized carbon reacts preferentially with the fluorine possibly liberated in the pyrolysis reaction to form carbon tetrafluoride. However, there is insufficient carbon to combine with more than a small percentage of the total available fluorine, so that the reaction proceeds essentially as a pyrolysis of the nitrogen trifluoride. This is especially the case when a non-consumable carbon anode is used, that is, an anode which is kept relatively cool, e.g., in the neighborhood of 1000° C. This can be accomplished, for example, by supporting the anode in a water-cooled metallic holder. Non-carbonaceous (metal) electrodes can also be used in this embodiment of the process of the invention.

It is also possible to pass a stream of nitrogen trifluoride, preferably with an inert gas as a carrier, directly through the flame of an electric arc. In this case, however, the presence of carbon should be avoided since carbon reacts readily with nitrogen trifluoride at high temperatures. The arc electrodes should be constructed of a suitable metal such as copper, nickel, tungsten, and the like. Such metal electrodes are preferably cooled, for example by internal circulation of a cooling liquid, to prevent or minimize corrosion.

Regardless of what means are used to produce the required high temperature, appreciable conversions to dinitrogen difluoride are obtained only if the product emerging from the hot reaction zone is cooled very rapidly (quenched) to a temperature not exceeding 100° C. The time required to cool the gaseous reaction product, that is, the time of transition from the reaction temperature to a temperature of 100° C. or lower, should not exceed one second. Preferably, it is in the range of 0.001 to 0.1 second. The optimum rate of flow through the hot reaction zone of the gaseous composition depends in large part on this quenching requirement, that is, on the efficiency of the quenching system. Reduced pressures facilitate rapid quenching in any given form of apparatus.

The necessary quenching can be achieved in various ways. For example, the off-gas upon leaving the hot reaction zone can be made to pass over the outside wall of a metal vessel containing a coolant material such as water, solid carbon dioxide or liquid nitrogen and located a short distance from the reaction zone, or the off-gas can be passed through a double-walled hollow cylinder with or without radial fins, cooled with circulating water.

The contact time, or residence time, of the nitrogen trifluoride within the hot reaction zone should be sufficiently short to minimize side reactions resulting in decomposition of the dinitrogen difluoride formed. While this contact time depends, in part at least, on the design of the apparatus and on the absolute pressure within the system, it can be said in general that it should not exceed ten seconds at the pyrolysis temperature. Preferably, the contact time is less than two seconds, and it can be as short as 0.01 second.

The absolute pressure of the reactant gas during the pyrolysis is not critical. Atmospheric pressure can be used. In general, however, because of the already discussed requirements of rapid quenching and short residence time, it is preferred to operate at reduced pressures, which can be as low as 1 mm. of mercury but are desirably in the range of 10–300 mm. of mercury. Reduced pressures are especially desirable when an electric arc is used as the source of heat, since the operation of the arc becomes more difficult with increase in pressure. With other types of reactors, e.g., externally heated tubular reactors, the absolute pressure is also preferably subatmospheric, e.g., in the range of 10–300 mm. of mercury, but it can be atmospheric or even superatmospheric.

When an electric arc is used as the source of heat, either to supply a hot inert gas plasma in which nitrogen trifluoride is injected or to heat directly (with metallic electrodes) a gas mixture containing nitrogen trifluoride, it is advantageous to use an arc of the improved general design illustrated in U.S. Patents 2,709,186 or 2,709,192.

A preferred type of electric arc is a magnetically rotated arc. In comparison with static arcs, a rotating arc is far more efficient by virtue of its much greater stability and of the far better contact between arc and reactants that it permits. The electric arcs used in the examples which follow were of this kind.

A particularly efficient type of magnetically rotated arc operates as follows: The gas to be heated passes through a symmetrical annular gap formed by a substantially cylindrical solid cathode and a substantially cylindrical hollow anode, wherein a continuous electrical discharge is rotated by magnetic lines of flux essentially parallel to the axis of rotation of the annular arc. This causes the arc to move at right angle to the magnetic field lines. The magnetic field is created by surrounding the arc chamber with a coil through which a current (preferably a direct current) passes. A field strength suitable to cause rotation is 100–200 gauss. The arc rotates extremely rapidly in the annular gap between the electrodes, its speed being estimated at 1000–10,000 revolutions per second, and it heats the gas very uniformly to extremely high temperatures as it passes through the gap. The heated gas leaves the arc chamber through the hollow anode.

The electrical characteristics of the rotating arc are essentially similar to those of the static arc. Thus, operating conditions of the arc may be varied over a wide range from the minimum voltage required to maintain the arc to high voltages, e.g., in the range of 10 to 75 volts or even much higher. In general, for a given current the required voltage of the arc is determined by the pressure in the system, the width of the arc gap, and the nature of the gas present in the arc chamber. The power requirements will, of course, depend on the quantity of gas passed through the rotating arc and the temperature to which it is to be heated.

The arc may be operated with a direct current or with an alternating current if the alternating current is of high frequency and is employed in combination with an alternating magnetic field which is in phase with the arc current. A direct current is greatly preferred, since only with a direct current is it possible to obtain a truly continuous rotating arc resulting in uniform heating and high stability. Current intensities in the range of 20 to 700 amperes are generally used.

The gaseous reaction product coming from the hot zone is first quenched rapidly to below 100° C., as already mentioned. Conveniently, the reaction product after quenching is passed through a system of traps cooled in liquid air or liquid nitrogen where the dinitrogen difluoride is held (it solidifies at about −110° C.) while all or nearly all of the more volatile gases such as fluorine, if any is present, nitrogen or other carrier gas, escape. Thus, the condensate is considerably enriched, and if desired it can be purified further by fractional distillation in a low temperature still. However, for some applications such as use as a polymerization initiator, it is unnecessary to employ pure dinitrogen difluoride, since even a dilute mixture with nitrogen or some other inert gas is satisfactory for that purpose.

The invention is illustrated in greater detail by the following examples.

*Example 1*

The source of heat was a magnetically rotated electric arc of the type described above. The cathode was a graphite rod 3/16" in diameter and the anode was a short hollow graphite cylinder of 5/8" external diameter and 1/8" internal diameter, mounted on a water-cooled ring-shaped copper holder which served to cool the anode. The arc was operated at 45–65 volts and 37–42 amperes, and the absolute pressure within the arc chamber was 90 mm. of mercury.

A stream of nitrogen was passed through the arc flame in the annular space between the electrodes, where it was heated to a temperature upwards of 2000° C., and left the arc zone through the hollow anode. Gaseous nitrogen trifluoride (which had been purified by gas chromatography and contained no dinitrogen difluoride) was injected in the incandescent plasma thus produced at a point approximately 3/8" downstream from the rotating arc flame. Pyrolysis took place at this point, and the product gases were then quenched very quickly to below 100° C. by impinging on the outer surface of a copper vessel filled with liquid nitrogen and located about 3/4" downstream from the arc zone. The cooled gaseous product was then led to a trap cooled with liquid nitrogen, where the condensable portions were collected.

In this example the mole ratio $NF_3/N_2$ was 0.23 and the flow rate of the nitrogen was 590 ml./minute, calculated at standard temperature and pressure. A total of 5 g. of nitrogen trifluoride was injected in the post-arc plasma. The condensable product (5 g.) was found by mass spectroscopy and chromatographic analysis to contain, on a molar basis, 68% of unchanged nitrogen trifluoride, about 30% of carbon tetrafluoride and 0.6% of dinitrogen difluoride, with small amounts of other products. The yield of dinitrogen difluoride was 3.7%, based on the unrecovered nitrogen trifluoride.

Carrying out the same procedure at mole ratios $NF_3/N_2$ of 0.13 and 0.33 and at operating pressures of 68 and 40 mm. of mercury had no appreciable effect on the composition of the condensable product.

*Example II*

The heat source was the same as in Example I except that the arc electrodes were metallic. The cathode was a tungsten rod ⅛" in diameter and the anode was a water-cooled, hollow copper cylinder having the same dimensions as the anode in Example I. The procedure was the same as in Example I except that the mole ratio $NF_3/N_2$ was 0.3, the flow rate was 536 ml./minute (calculated at standard temperature and pressure), the arc was operated at 37 volts and 43 amperes and the pressure within the system was 48 mm. of mercury.

The condensable product collected in a trap cooled with liquid nitrogen was found by mass spectroscopy and gas chromatographic analysis to contain, on a molar basis, unchanged nitrogen trifluoride, some silicon tetrafluoride (apparently derived from the glass portions of the apparatus) and dinitrogen difluoride in an amount corresponding to a yield of about 0.7%, based on the unrecovered nitrogen trifluoride.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Process for preparing dinitrogen difluoride which comprises passing a gaseous composition in which the reactive component consists essentially of a binary nitrogen fluoride wherein the atomic ratio of fluorine to nitrogen is at least 2:1, through a reaction zone at a temperature of at least 1000° C. and with a contact time within said zone not exceeding 10 seconds, and cooling the effluent gaseous reaction product to a temperature below 100° C. within a maximum period of one second.

2. The process of claim 1 in which the binary nitrogen fluoride is nitrogen trifluoride.

References Cited in the file of this patent

Sneed et al.: "Comprehensive Inorganic Chemistry," vol. 5, p. 48, 1956.